(12) United States Patent
Hadden et al.

(10) Patent No.: US 6,755,287 B2
(45) Date of Patent: Jun. 29, 2004

(54) ROTARY SHEAR DAMPER

(75) Inventors: Steve L. Hadden, Peoria, AZ (US); David A. Osterberg, Glendale, AZ (US); Toren S. Davis, Peoria, AZ (US); Dale T. Ruebsamen, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 6 days.

(21) Appl. No.: 10/302,455

(22) Filed: Nov. 22, 2002

(65) Prior Publication Data

US 2004/0099494 A1 May 27, 2004

(51) Int. Cl.[7] .............................................. F16D 57/00
(52) U.S. Cl. ..................................... 188/290; 188/306
(58) Field of Search .............................. 188/290, 296, 188/298, 293, 294, 306, 307

(56) References Cited

U.S. PATENT DOCUMENTS

| | | | | | |
|---|---|---|---|---|---|
| 1,141,246 | A | * | 6/1915 | Houdaille | 188/309 |
| 1,908,996 | A | * | 5/1933 | Moorhouse | 188/306 |
| 2,314,493 | A | * | 3/1943 | Guy | 188/306 |
| 3,861,503 | A | * | 1/1975 | Nash | 188/276 |
| 4,480,728 | A | * | 11/1984 | Bailey et al. | 188/271 |
| 4,638,528 | A | * | 1/1987 | Omata | 16/82 |
| 4,697,674 | A | * | 10/1987 | Tangorra | 188/298 |
| 4,938,322 | A | * | 7/1990 | Sugasawara et al. | 188/290 |
| 5,081,882 | A | * | 1/1992 | Kogure | 74/574 |
| 5,085,298 | A | * | 2/1992 | Sollami | 188/314 |
| 5,133,438 | A | * | 7/1992 | Yuhashi | 192/58.41 |
| 5,211,267 | A | * | 5/1993 | Clark | 188/276 |
| 5,477,947 | A | * | 12/1995 | Schalles et al. | 188/298 |
| 5,921,357 | A | * | 7/1999 | Starkovich et al. | 188/267.2 |
| 5,984,057 | A | * | 11/1999 | Nash | 188/290 |
| 6,098,765 | A | * | 8/2000 | Kato et al. | 188/290 |
| 6,341,677 | B1 | * | 1/2002 | Oliver et al. | 188/307 |

* cited by examiner

Primary Examiner—Matthew C. Graham
Assistant Examiner—Benjamin A. Pezzlo

(57) ABSTRACT

A rotary damper (10) includes a stationary member (12) and a rotating member (14) provided within the stationary member (12) so that a gap (16) is defined between the rotating member (14) and the stationary member (12). The rotating member (14) further includes a central shaft (18) provided therein. A viscous fluid (19) is provided in the gap (16) and has an associated shear that provides a velocity damping within the gap (16). A differential growth in the gap (16) caused by temperature variation compensates for temperature damping variation. A compliant member (20) is provided within the stationary member (12) for providing thermal compensation. A secondary hermetic seal (26) is provided on the stationary member (12) for permitting limited rotation, defining a vacuum environment and preventing viscous fluid leakage to an external environment.

5 Claims, 5 Drawing Sheets

ROTARY SHEAR DAMPER

FIELD OF THE INVENTION

The present invention relates generally to an apparatus for providing damping, and more specifically to an apparatus that provides damping using direct shear of a viscous fluid.

BACKGROUND OF THE INVENTION

Since the onset of space exploration and satellite usage there has been a need to control deployments of spacecraft mounted appendages such as antennas, solar arrays, and booms. Controlling such deployments can reduce the loads of appendage spacecraft primary structures as well as momentum compensation demands on the spacecraft attitude control system.

Generally, the appendage deployments are controlled by passive rotary dampers. These rotary dampers normally are attached to a spring-loaded device or motor in a parallel fashion. The rotary dampers provide velocity damping to the system by either restricting fluid flow across an orifice or by electro-magnetically removing energy from the system by generating eddy currents internal to the spring-loaded device.

However, such rotary dampers have a propensity to leak viscous fluid from shaft seals and have inconsistent performance due to a lack of thermal compensation. In addition, these rotary dampers require additional power for heaters as well as complicated switching electronics to compensate for a wide range of damper performance over different temperatures.

In addition, the above-described dampers that generate eddy currents require a gear reduction train to derive practical damping characteristics. This gear reduction train adds a high amount of complexity, weight and cost as well as reduced reliability.

Therefore, what is needed is a rotary damper that can control appendage deployment at a low level of complexity and cost and in a reliable manner.

SUMMARY OF THE INVENTION

In view of the above, the present invention provides a rotary damper for providing control of appendage deployment. The rotary damper includes a stationary member, a rotating member provided within the stationary member, a gap defined between the rotating member and the stationary member, and a viscous fluid provided in the gap. The viscous fluid has a shear that provides a velocity damping within the gap. A differential growth generated in the gap as a result of different coefficients of thermal expansion varies the width of the gap and compensates for temperature damping variation. The rotary damper further includes a linear bellows that defines a viscous fluid chamber and provides fluid thermal compensation. A rotary bellows is provided on the stationary member and on the central shaft for preventing viscous fluid leakage.

In a first species of the rotary damper, the stationary member and the rotating member comprises a drum damper in which the stationary member constitutes a stationary housing having a first coefficient of thermal expansion and the rotating member comprises a rotating cylinder having a second coefficient of thermal expansion.

In a second species of the rotary damper, the stationary member comprises a stationary housing and a plurality of stationary discs, and the rotating member comprises a plurality of rotating discs interspersed between the plurality of stationary discs in an alternating configuration. The rotating discs and stationary discs have the second coefficient of thermal expansion while the stationary housing has the first coefficient of thermal expansion.

The present invention consequently provides temperature damping compensation and thermal compensation without the complexities and costs of a gear reduction train.

BRIEF DESCRIPTION OF THE DRAWINGS

Objects and advantages of the present invention will be more readily apparent from the following detailed description of the preferred embodiments thereof when taken together with the accompanying drawings in which.

DETAILED DESCRIPTION OF THE PREFERRED EMBODIMENTS

Figure 1:
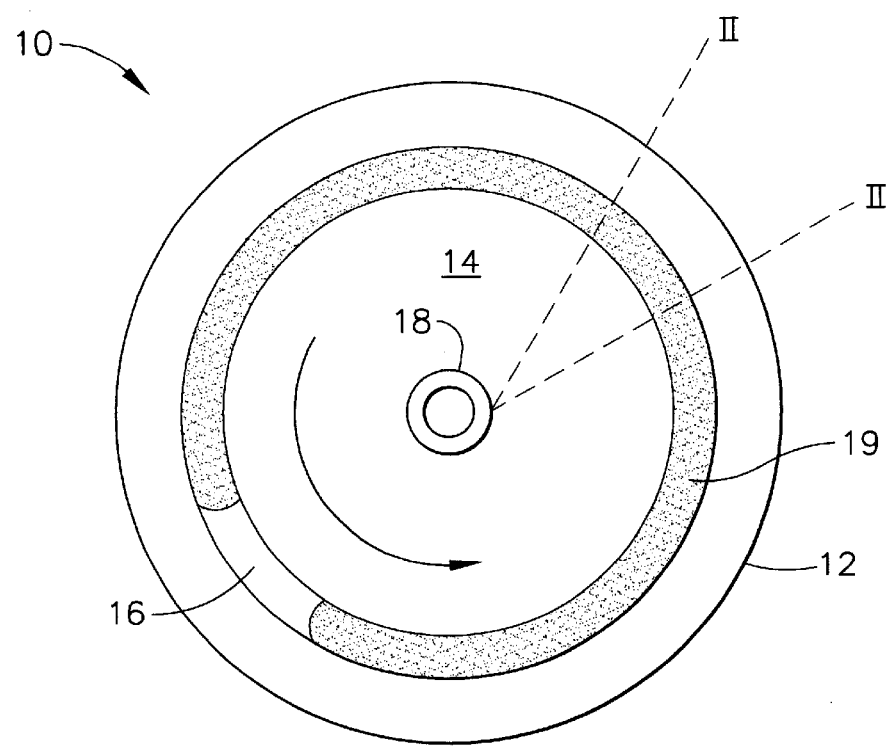
FIG. 1 is an exemplary top view of a rotary damper according to a generic implementation of the present invention.

Referring now to the drawings in which like numerals reference like items, FIG. 1 shows a top view of an exemplary rotary damper 10 according to a generic implementation of the present invention. The rotary damper 10 includes a stationary member 12 and a rotating member 14 provided within the stationary member 12. A gap 16 is defined between the rotating member 14 and the stationary member 12. These elements will be discussed in more detail below.

The stationary member 12 is composed of a material with a first coefficient of thermal expansion (CTE). The stationary member 12 is connected to a deployment device such as an actuator (not shown) by fastening it to a stationary portion of the actuator in a manner known by those skilled in the art.

The rotating member 14 is composed of a material with a second CTE of different magnitude than the first CTE of the stationary member 12. The rotating member 14 includes a central aperture for accommodating a central shaft 18. The central shaft 18 provides torque to the rotating member 14 by way of the deployment actuator device (not shown). The rotating member 14 is connected to the actuator by fastening the central shaft 18 to the rotating portion of the actuator in a manner that is also known.

Figure 2:
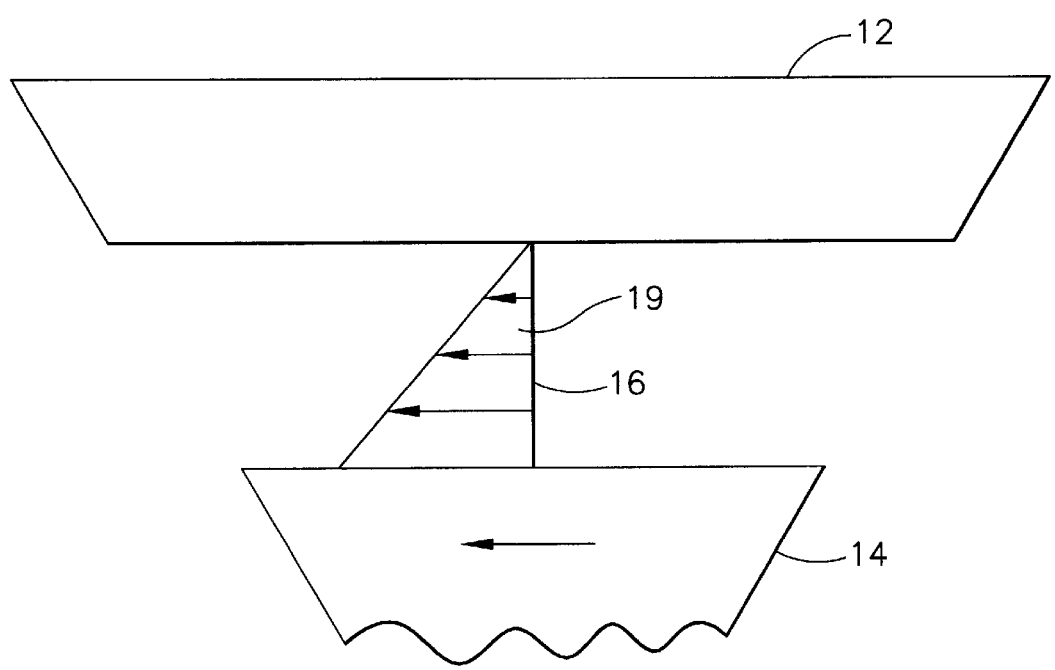
FIG. 2 is an exemplary top view of a section of the exemplary rotary damper of FIG. 1 along lines II—II.

As mentioned above, a gap 16 is provided between the rotating member 14 and the stationary member 12. As shown in FIG. 2, a viscous fluid 19 is provided in this gap 16 for providing a damping force. More specifically, the viscous fluid 19 provides a damping force by shearing between the stationary member 12 and the rotating member 14. During this shearing, the operating temperature of the viscous fluid 19 will either increase or decrease. Changes in operating temperature will change the viscosity of the viscous fluid 19, and will subsequently affect the damping performance. It is beneficial to maintain a substantially constant level of damping over a wide temperature range. In the present invention, as will be more fully discussed below, a differential growth of the gap 16 compensates for temperature damping variation.

The damping force provided by the viscous fluid is defined by the following formula:

$$F = (\Pi * A * V*)/g$$

F represents the damping force, Π represents the frictional coefficient, A represents the effective area of the shearing, V represents a velocity of shearing and g represents the orthogonal gap width. From Newton's viscosity law and the above formula, it can be seen that the damping force is directly proportional to the viscosity of the viscous fluid 19 and inversely proportional to the orthogonal gap width. Therefore, the orthogonal gap width can be varied in order to account for changes in damping performance that result from the changes in the fluid viscosity during the operating temperature changes.

The stationary member 12 and the rotating member 14 expand and contract when the operating temperature changes. Varying the CTEs of the stationary member 12 and the rotating member 14 will result in a relative change in the orthogonal width of the gap 16. This relative change of the orthogonal width will be referred to as differential growth. Preferably, the materials are selected so that the CTE of the rotating member 14 is approximately ten times greater in magnitude than the CTE of the stationary member 12. Such a structure can be obtained by, for example, utilizing Delrin®, plastic or aluminum for the rotating member material and steel for the stationary member material.

Figure 3B:
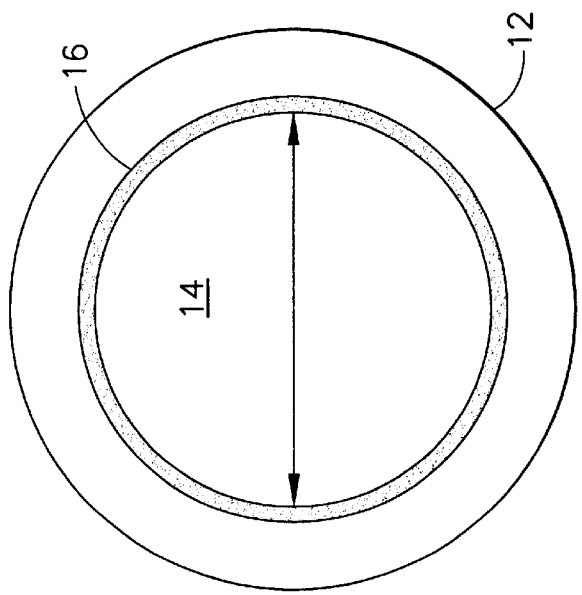
FIGS. 3A–3B are exemplary top views of a rotary damper with varying gap widths.
Figure 3A:
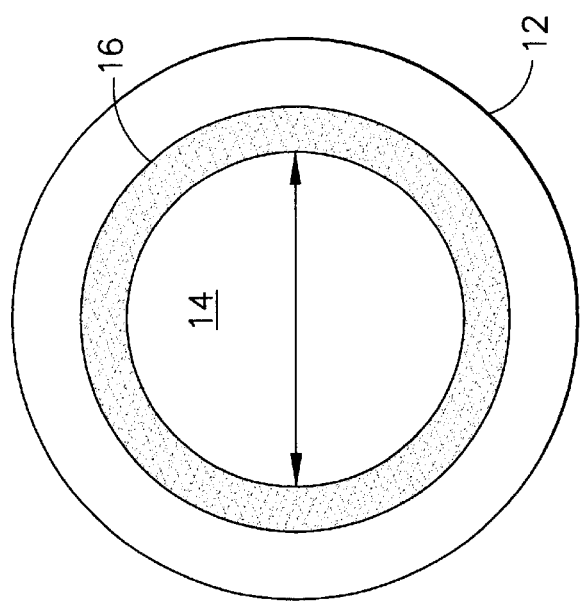

Referring to FIGS. 3A–3B, the differential growth is further shown. As the operating temperature changes, the width of the gap 16 changes as a result of the differential growth between the stationary member 12 and the rotary member 14. The change in gap size varies the amount of damping force provided by the viscous fluid 19 and thereby provides compensation for the variation in damping caused by fluid viscosity fluctuation during operating temperature changes. This will be referred to as temperature damping compensation.

Figure 4:
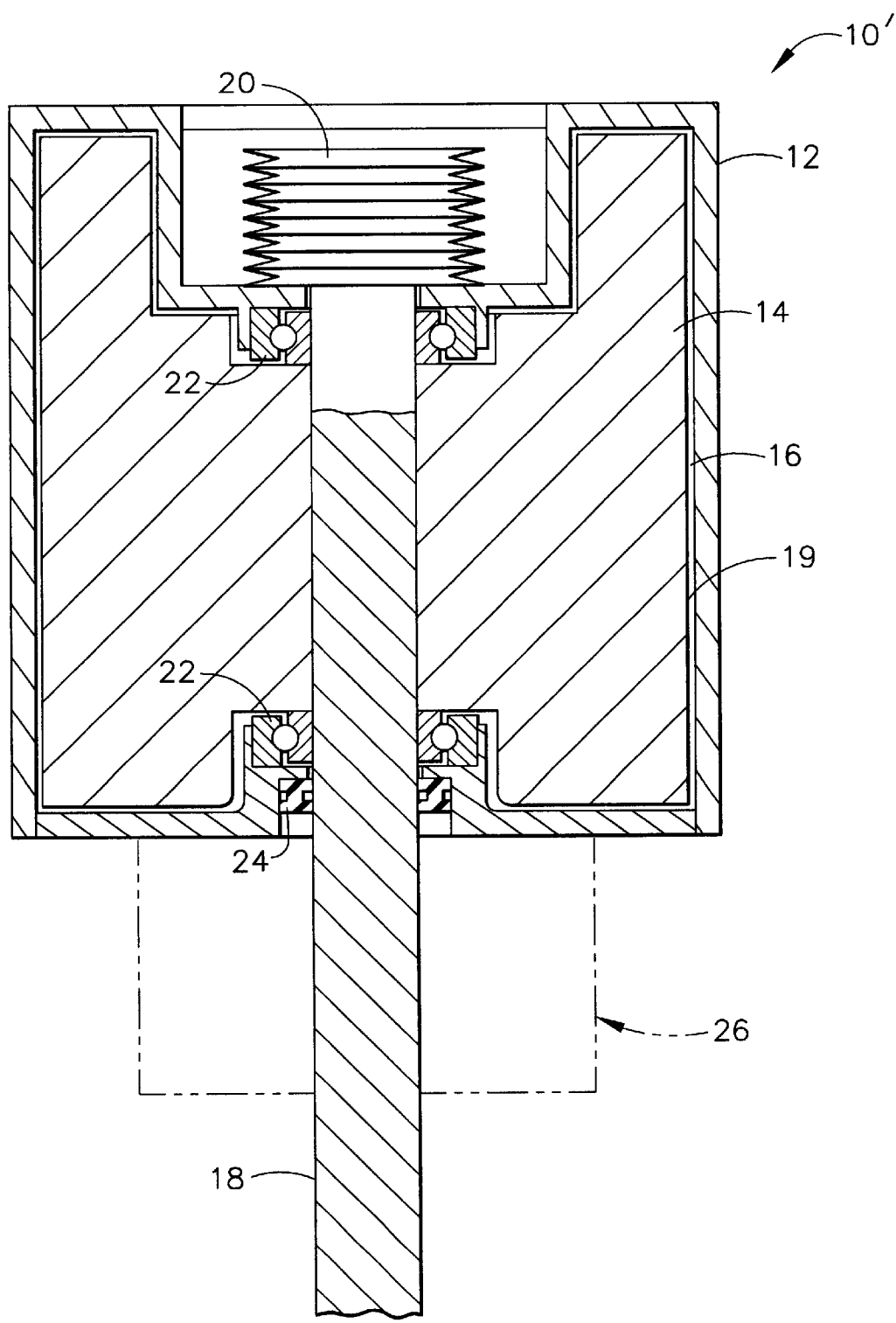
FIG. 4 is an exemplary view of a first species of the present invention in which the rotary damper is a drum damper.

Referring to FIG. 4, a drum damper 10' constituting a first species of the present invention will be discussed. Like reference numerals refer to like parts with respect to the generic rotary damper 10 of FIG. 1. The drum damper 10' includes a stationary outer housing 12 (stationary member) and a rotating drum 14 (rotating member) provided within the stationary outer housing 12 with a gap 16 provided between the rotating drum 14 and the stationary outer housing 12. Viscous fluid 19 is provided within this gap 16 for providing a damping force as described above. A central shaft 18 is provided within the rotating drum 14. The central shaft 18 is secured to the rotating drum (drum) 14 and is supported by and aligned to the housing by a plurality of ball bearings 22. A primary shaft seal 24 (sealing member), such as a quad O-ring, is provided over the shaft and positioned immediately below the ball bearings 22 for preventing viscous fluid leakage from the drum damper 10'. The materials of the stationary outer housing 12 and the drum 14 are selected so that they have different CTEs as described above.

During deployment of the drum damper 10', the central shaft 18 begins to rotate, which rotates the drum 14. Rotation of the drum 14 subsequently causes the viscous fluid 19 in the gap 16 to shear between the drum 14 and the stationary outer housing 12, which provides damping and controls deployment. The different CTEs of the drum 14 and the stationary outer housing 12 result in differential growth during temperature variation. As discussed above, this differential growth provides temperature damping compensation.

In addition to the temperature damping compensation described above, fluid thermal compensation is necessary in order to provide proper operation of the rotary damper 10. Not only does the fluid viscosity change over temperature, but the fluid also expands and contracts during temperature changes at a rate that is much faster than the outer stationary housing 12 or the drum 14. For example, during high temperatures a pressure inside the gap 16 can become so high that it causes viscous fluid leakage. Therefore, the drum damper 10' includes a compliant member for maintaining the viscous fluid 19 in the gap 16 and for providing fluid thermal compensation. The compliant member is composed of a linear bellows 20 positioned on the stationary outer housing 12 for defining a viscous fluid chamber therein. The linear bellows 20 is initially overfilled by a predetermined amount to account for cold temperature contraction and is adequately sized to stroke or expand for hot fluid compensation. During deployment the linear bellows 20 strokes linearly as the viscous fluid 19 expands and contracts, thereby, providing fluid compensation.

Although the primary shaft seal 24 described above substantially prevents fluid leakage from the drum damper 10', a secondary sealing member is included for preventing fluid leakage to an external environment. The sealing member is a redundant hermetic seal 26 (hermetic seal), which is disclosed in U.S. patent application Ser. No. 10/302,502 to Ruesbsamen et al., the contents of which are incorporated herein by reference.

Figure 5B:
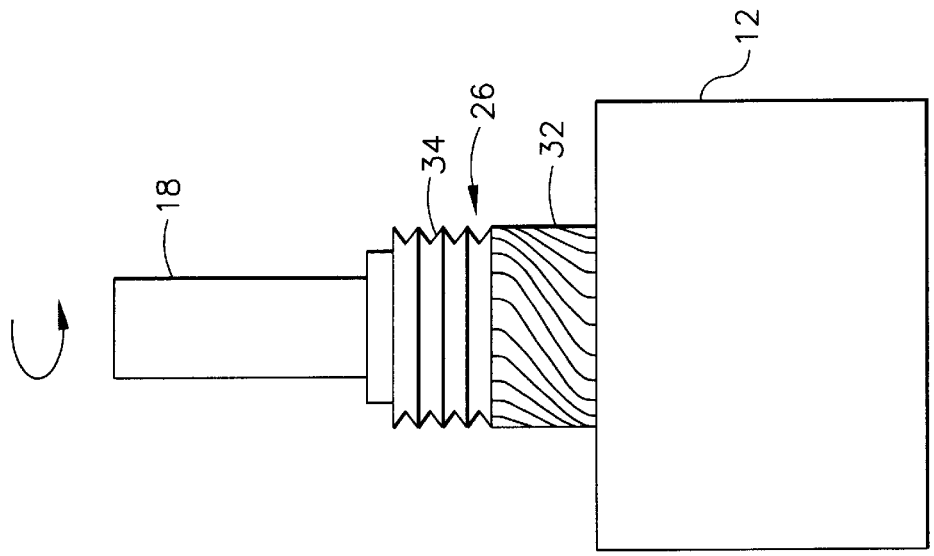
FIGS. 5A–5B are exemplary views of the sealing member of the rotary damper.
Figure 5A:
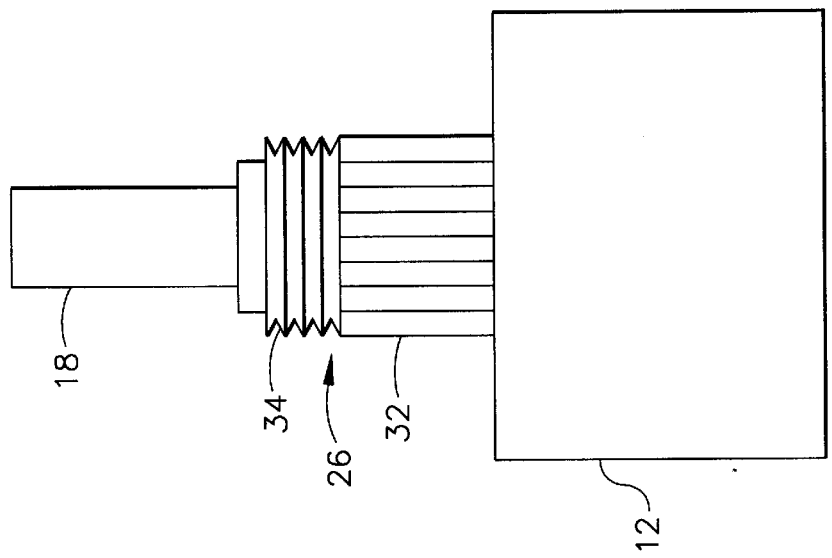

Referring to FIGS. 5A–5B, the hermetic seal 26 is preferably composed of silicon rubber or metal and is bonded to the stationary outer housing 12 and the central shaft 18. The hermetic seal 26 is composed of closely spaced vertical convolutes 32 for permitting limited rotation. The vertical convolutes 32 are designed to be long enough to permit a desired shaft rotation by folding on themselves. The hermetic seal 26 may also include horizontal convolutes 34 capable of expanding and contracting for accommodating the length changes of the vertical convolutes 32 during rotation of the central shaft 18. More specifically, as shown in FIG. 6B, the horizontal convolutes 34 expand in order to permit the vertical convolutes 32 to fold on themselves. This hermetic seal 26 (or rotary bellows) allows torsional flexibility while defining a vacuum environment needed for the central shaft 18 and stationary outer housing 12.

Figure 6:
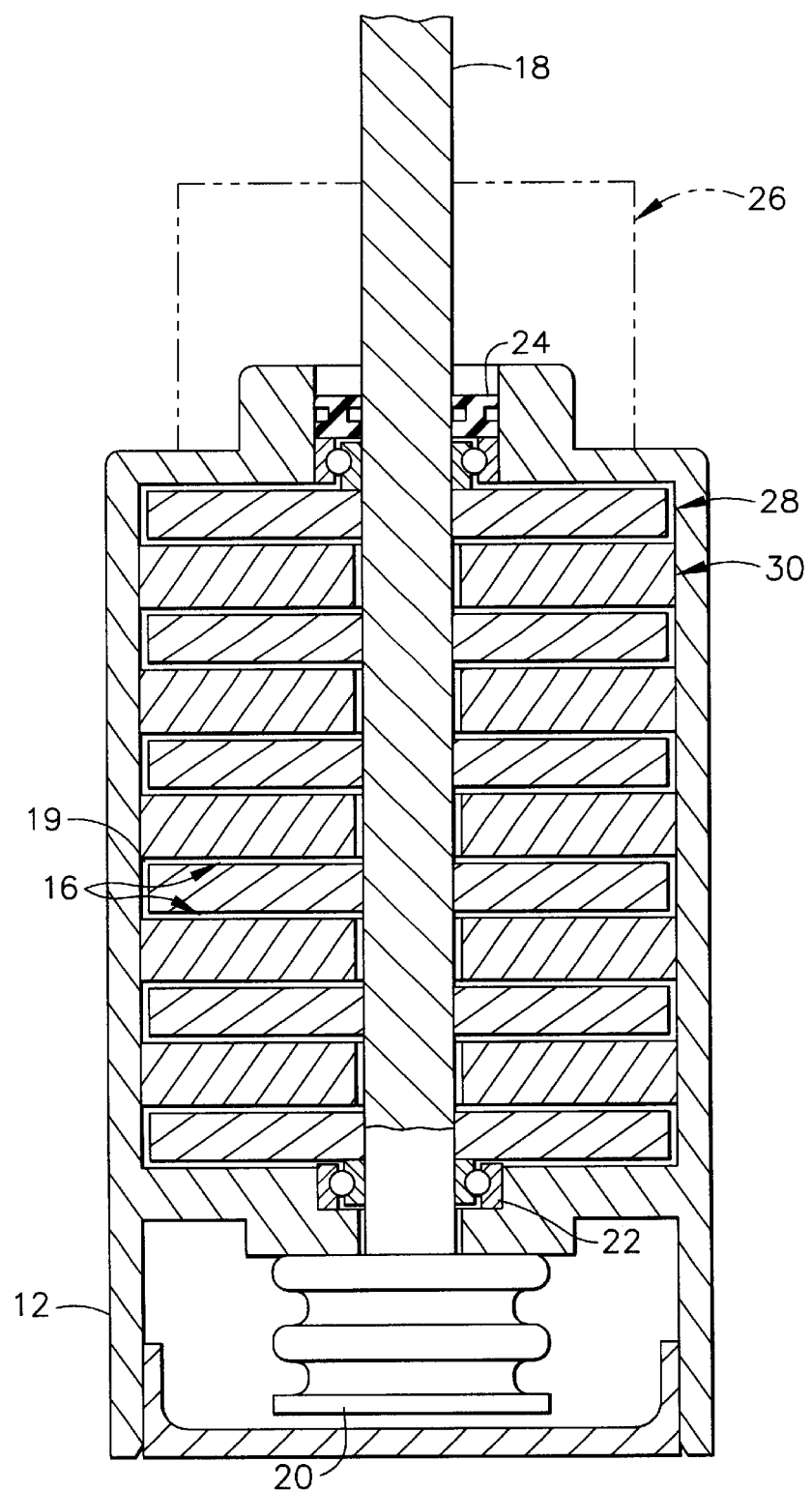
FIG. 6 is an exemplary view of a second species of the present invention in which the rotary damper is a stack damper.

Referring now to FIG. 6, a stack damper 10" constituting a second species of the present invention will be discussed. Like reference numerals refer to like parts with respect to the generic rotary damper 10 of FIG. 1. The stack damper 10" includes a stationary outer housing (stationary member) 12, a plurality of rotating discs 28 provided within the stationary outer housing 12 and connected to a central shaft 18, and a plurality of stationary discs 30 connected to the stationary outer housing 12. As discussed above, a linear bellows 20 (compliant member) is provided on the stationary outer housing 12 for defining a viscous fluid chamber, for maintaining a viscous fluid 19 in the gap 16 (discussed below) and for providing fluid thermal compensation. The stack damper 10" also includes a set of bearings 22, a primary shaft seal 24 and a hermetic seal 26 as discussed above. The stationary outer housing 12 and both pluralities of discs 28, 30 will be discussed more specifically below.

The plurality of rotating discs 28 and the plurality of stationary discs 30 are interspersed between one another in an alternating configuration. As shown in FIG. 6 when viewed in a top-down manner, the configuration alternates between a set of rotating discs and a set of stationary discs. The gap 16 is provided between a set of stationary disc and a set of rotating discs. The viscous fluid 19 is provided in this gap 16 for providing velocity damping within the gap 16.

The plurality of rotating discs 28 are connected to the central shaft 18 by being slip fit on a plurality of respective shaft splines (not shown). The plurality of stationary discs 30 are connected to the stationary outer housing 12 by being slip fit on a plurality of respective housing grooves (not shown). The stationary outer housing 12 has a first CTE. The plurality of rotating discs 28 and the plurality of stationary discs 30 have a second CTE different than the first CTE. Preferably, the second CTE of both pluralities of discs 28, 30 is greater than the first CTE of the stationary outer housing 12. A differential growth between the pluralities of discs 28, 30 and the stationary outer housing 12 caused by temperature variation compensates for temperature damping variation as discussed above. However, because the gap is provided between the discs in the stack damper 10" rather than between a drum 14 and a stationary outer housing 12 as in the drum damper 10', an increased area of shearing surface is provided. The increased shearing surface results in a greater damping force and a more lightweight device.

Therefore, the present invention provides a rotary damper 10 with improved damper performing and linearity over varying temperature ranges without the need for heaters and other electronic circuitry. It is less sensitive to fluid cavities caused by insufficient thermal compensation and provides a redundant sealing measure to ensure that no fluid escapes to the external environment.

While the above description is of the preferred embodiment of the present invention, it should be appreciated that the invention may be modified, altered, or varied without deviating from the scope and fair meaning of the following claims. For example, with respect to the stack damper 10", the pluralities of discs could be provided in a different configuration while still providing a gap. In addition, the CTEs of the various respective members could be varied to provide a different differential gap growth.

What is claimed is:

1. A rotary damper comprising:
a housing having at least an inner surface, an outer surface, and a shaft opening extending between the housing inner and outer surfaces;
a shaft rotationally mounted to the housing and disposed at least partially within the shaft opening to define a viscous fluid passageway therebetween;
a rotating member mounted on the shaft and disposed within the housing, the rotating member spaced apart from at least a portion of the housing inner surface to define a gap therebetween, wherein the gap is in fluid communication with the viscous fluid passageway;
a viscous fluid disposed at least within the gap; and
a compliant member coupled to the housing outer surface and surrounding the viscous fluid passageway, to thereby provide fluid thermal compensation.

2. A rotary damper comprising:
rotating member provided within the stationary member so that a gap is defined between the rotating member and the stationary member, wherein the rotating member further includes a central shaft provided therein;
a sealing member located on the central shaft that includes:
a primary shaft seal for containing the viscous fluid; and
a secondary redundant hermetic seal for substantially venting viscous fluid leakage, and that includes vertical convolutes for providing torsional flexibility while substantially preventing viscous fluid leakage to an exterior environment;
a viscous fluid provided in the gap and having an associated shear that provides a velocity damping within the gap; and
a compliant member positioned on the stationary member for defining a viscous fluid chamber, for maintaining the viscous fluid in the gap and for providing fluid thermal compensation,
wherein a differential growth in the gap caused by temperature variation provides temperature damping compensation.

3. The rotary damper of claim 2, wherein the secondary redundant hermetic seal further includes horizontal convolutes for permitting axial changes in length of the vertical convolutes during rotation.

4. A drum damper comprising:
a stationary outer housing having a first coefficient of thermal expansion, wherein a hermetic seal is provided on the stationary housing and on a central shaft for permitting limited rotation;
a rotating cylinder provided within the stationary outer housing so that a gap is defined therebetween and having a second coefficient of thermal expansion different than the first coefficient of thermal expansion;
a viscous fluid provided in the gap having an associated shear that provides a velocity damping within the gap; and a sealing member located on the central shaft includes a primary shaft seal for containing the viscous fluid; and a second redundant hermetic seal for substantially venting viscous fluid leakage, and that includes vertical convolutes for providing torsional flexibility while substantially preventing viscous fluid leakage to an exterior environment;
a compliant member positioned on the stationary member for defining a viscous fluid chamber, for maintaining the viscous fluid in the gap and for providing fluid thermal compensation,
wherein a differential growth between the stationary outer housing and the rotating cylinder caused by temperature variation compensates for temperature damping variation.

5. The stack damper comprising:
a stationary outer housing having a first coefficient of thermal expansion;
a plurality of rotating discs provided within the stationary outer housing connected to a central shaft, and having a second coefficient of thermal expansion different than the first coefficient of thermal expansion;
a plurality of stationary discs having the second coefficient of thermal expansion, connected to the stationary outer housing and interspersed between the plurality of rotating discs in an alternating configuration with a gap provided therebetween;
a viscous fluid provided in the gap having an associated shear that provides a velocity damping within the gap; and
a sealing member located on the central shaft, the sealing member including:
a primary shaft seal for containing the viscous fluid, and
a second redundant hermetic seal including horizontal and vertical convolutes for providing torsional flexibility while substantially preventing viscous fluid leakage to an exterior environment, wherein a differential growth between the stationary outer housing, the plurality of rotating discs and the plurality of stationary discs caused by temperature variation compensates for temperature damping variation.

* * * * *